(12) United States Patent
Burdeniuc

(10) Patent No.: US 7,192,990 B2
(45) Date of Patent: *Mar. 20, 2007

(54) TERTIARY AMINO ALKYL AMIDE POLYURETHANE CATALYSTS DERIVED FROM LONG CHAIN ALKYL AND FATTY CARBOXYLIC ACIDS

(75) Inventor: Juan Jesus Burdeniuc, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 18 days.

This patent is subject to a terminal disclaimer.

(21) Appl. No.: 10/724,888

(22) Filed: Dec. 2, 2003

(65) Prior Publication Data

US 2004/0132851 A1    Jul. 8, 2004

Related U.S. Application Data

(63) Continuation-in-part of application No. 10/336,371, filed on Jan. 3, 2003, now Pat. No. 6,762,211.

(51) Int. Cl.
*C08G 18/18* (2006.01)

(52) U.S. Cl. ............ 521/128; 521/129; 521/130; 521/170

(58) Field of Classification Search .......... 521/128, 521/129, 130, 170
See application file for complete search history.

(56) References Cited

U.S. PATENT DOCUMENTS

| | | |
|---|---|---|
| 4,007,140 A | 2/1977 | Ibbotson |
| 4,012,445 A | 3/1977 | Priest et al. |
| 4,242,467 A | 12/1980 | Zimmerman |
| 4,617,286 A * | 10/1986 | Arai et al. ............ 502/167 |
| 4,644,017 A | 2/1987 | Haas et al. |
| 4,735,970 A | 4/1988 | Sommerfeld et al. |
| 5,124,367 A | 6/1992 | Barker et al. |
| 5,200,434 A | 4/1993 | Bailey, Jr. et al. |
| 5,302,303 A | 4/1994 | Clatty et al. |
| 5,344,853 A | 9/1994 | Knipp et al. |
| 5,374,486 A | 12/1994 | Clatty et al. |
| 5,489,618 A * | 2/1996 | Gerkin ............... 521/128 |
| 5,736,588 A | 4/1998 | Eisen et al. |
| 6,156,814 A * | 12/2000 | Chen et al. ........... 521/129 |
| 6,346,559 B1 * | 2/2002 | Thiele et al. .......... 521/128 |
| 6,737,446 B1 * | 5/2004 | Burdeniuc ............ 521/128 |
| 6,759,447 B1 * | 7/2004 | Burdeniuc et al. ...... 521/128 |
| 6,762,211 B1 * | 7/2004 | Burdeniuc ............ 521/128 |

FOREIGN PATENT DOCUMENTS

| | | |
|---|---|---|
| EP | 0 579 080 A2 | 1/1994 |
| EP | 0 730 619 B1 | 9/1997 |
| EP | 0 877 042 A1 | 11/1998 |
| WO | WO 02/098940 A1 | 12/2002 |

OTHER PUBLICATIONS

European Search Report No. 03029980.4-2115 PCT dated Oct. 12, 2005.

* cited by examiner

*Primary Examiner*—John M. Cooney, Jr.
(74) *Attorney, Agent, or Firm*—Michael Leach

(57) ABSTRACT

The present invention relates to a method for preparing a polyurethane foam, which comprises reacting an organic polyisocyanate and a polyol in the presence of water as a blowing agent, a cell stabilizer, and an acid-blocked tertiary amino alkyl amide catalyst composition. The catalyst composition is represented by the formula I:

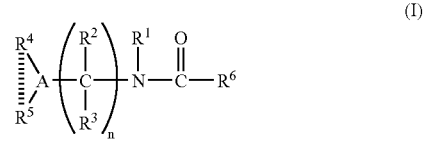

(I)

wherein $R^1$, $R^2$, $R^3$, $R^4$, $R^5$, $R^6$, A, and n are as defined herein and wherein the tertiary amino alkyl amide catalyst of formula I is acid-blocked.

18 Claims, No Drawings

TERTIARY AMINO ALKYL AMIDE POLYURETHANE CATALYSTS DERIVED FROM LONG CHAIN ALKYL AND FATTY CARBOXYLIC ACIDS

CROSS-REFERENCE TO RELATED APPLICATIONS

This application is a continuation-in-part of application Ser. No. 10/336,371 filed 3 Jan. 2003 now U.S. Pat. No. 6,762,211.

BACKGROUND OF THE INVENTION

The present invention relates to the use of tertiary amino alkyl amides as catalysts for producing polyurethane foams.

The present invention relates to tertiary amino alkyl amide catalysts for producing polyurethane foams. Polyurethane foams are widely known and used in automotive, housing and other industries. Such foams are produced by reaction of a polyisocyanate with a polyol in the presence of various additives. One such additive is a chlorofluorocarbon (CFC) blowing agent that vaporizes as a result of the reaction exotherm causing the polymerizing mass to form a foam. The discovery that CFCs deplete ozone in the stratosphere has resulted in mandates diminishing CFC use. Production of water blown foams, in which blowing is performed with carbon dioxide ($CO_2$) generated by the reaction of water with the polyisocyanate, has therefore become increasingly important. Tertiary amine catalysts are typically used to accelerate blowing (reaction of water with polyisocyante to generate $CO_2$) and gelling (reaction of polyol with isocyanate).

The ability of the tertiary amine catalyst to selectively promote either blowing or gelling is an important consideration in selecting a catalyst for the production of a particular polyurethane foam. If a catalyst promotes the blowing reaction to a too high degree, much of the $CO_2$ will be evolved before sufficient reaction of isocyanate with polyol has occurred, and the $CO_2$ will bubble out of the formulation, resulting in collapse of the foam. A foam of poor quality will be produced. In contrast, if a catalyst too strongly promotes the gelling reaction, a substantial portion of the $CO_2$ will be evolved after a significant degree of polymerization has occurred. Again, a poor quality foam will be produced, this time characterized by high density, broken or poorly defined cells, and other undesirable features.

Tertiary amine catalysts generally are malodorous and offensive and many have high volatility due to their low molecular weight. Release of the tertiary amine during the foam processing may present significant safety and toxicity problems, and release of residual amine from customer products is generally undesirable.

Amine catalysts which contain amide functionality derived from carboxylic acids with long chain alkyl groups ($C_6$ or higher) and fatty acids have an increased molecular weight and hydrogen bonding ability and reduced volatility and odor when compared with related structures which lack this functionality. Furthermore, catalysts which contain amide functionality chemically bond into the polyurethane polymer during the reaction and are not released from the finished product. Catalyst structures that embody this concept are typically of low to moderate activity and promote both the blowing (water-isocyanate) and the gelling (polyol-isocyanate) reactions to varying extents.

U.S. Pat. No. 4,242,467 discloses the use of morpholino and piperazino substituted ureas as catalysts for producing polyurethane foams.

U.S. Pat. No. 4,644,017 discloses the use of certain diffusion stable amino alkyl ureas having tertiary amino groups in the production of a polyisocyanate addition product that does not discolor or change the constitution of surrounding materials. Specifically taught are Catalyst A and Catalyst D which are reaction products of dimethylaminopropylamine and urea.

U.S. Pat. No. 4,007,140 discloses the use of N,N'-bis(3-dimethylaminopropyl)urea as a low odor catalyst for the production of polyurethanes. The use of N-(3-dimethylamino-propyl)formamide is also described as a catalyst to make polyurethane foams.

U.S. Pat. No. 4,012,445 discloses the use of beta-amino carbonyl compounds as catalysts for the production of polyurethane foams. In these catalysts, the beta-amino part is present as a dialkylamino or a N-morpholino or a N,N'-piperazino heterocyclic nucleus and the carbonyl part is present as an amido or ester group.

U.S. Pat. No. 4,735,970 discloses a process for the production of cellular polyurethanes using special amine-$CO_2$ adducts and homogeneous mixtures of these adducts. The use of N-(3-dimethylaminopropyl)-formamide is also described as a catalyst to make polyurethane foams.

U.S. Pat. No. 5,200,434 discloses the use of amide derivatives of alkylene oxide polyethers and their uses in polyurethane foam formulation.

U.S. Pat. Nos. 5,302,303, 5,374,486, and 5,124,367 disclose the use of fatty amido amines as a component necessary for the stabilization of isocyanate compositions containing flame-retardants. The shelf-life stability of isocyanate-reactive compositions is often adversely affected by the addition of flame-retardants, especially those based on phosphorous, zinc, antimony, and aluminum. The use of fatty amino amides improves the storage stability of these isocyanate mixtures.

BRIEF SUMMARY OF THE INVENTION

The present invention relates to a method for preparing polyurethane foams, which comprises reacting an organic polyisocyanate and a polyol in the presence of water as a blowing agent, a cell stabilizer, and a tertiary amino alkyl amide catalyst composition. The catalyst composition is represented by the formula I:

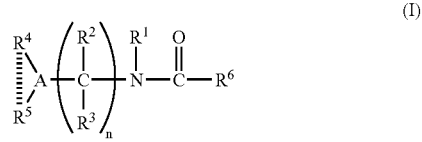

wherein A represents CH or N;

$R^1$ represents hydrogen or

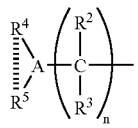

n is an integer from 1 to 3;

$R^2$ and $R^3$ each represent hydrogen or a $C_1$–$C_6$ linear or branched alkyl group; $R^4$ and $R^5$ each represent a $C_1$–$C_6$ linear or branched alkyl group when A represents N, or together $R^4$ and $R^5$ represent a $C_2$–$C_5$ alkylene group when A represents N; or together $R^4$ and $R^5$ may be a $C_2$–$C_5$ alkylene group containing $NR^7$ when A represents CH or N, where $R^7$ is selected from the group consisting of hydrogen, a $C_1$–$C_4$ linear or branched alkyl group, and

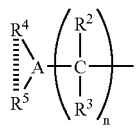

and; $R^6$ represents a $C_5$–$C_{35}$ linear or branched alkyl, alkenyl, or aryl group.

The present invention provides a reactive catalyst composition for making a water blown flexible polyurethane foam. The reactive catalysts contain amide functionality, which enables the catalyst to react into the polyurethane matrix. These reactive catalysts can be used as gelling catalysts or blowing catalysts with complementary blowing or gelling co-catalysts, respectively, which may or may not contain reactive functional groups to produce polyurethane foam materials. The reactive catalysts produce polyurethane foams, which have no amine emissions.

The use of these catalysts in conjunction with complementary gelling or blowing co-catalysts improves physical properties and enhances processibility of the foam. As gelling catalysts, these amide catalysts in conjunction with blowing co-catalysts improve the airflow of the foam. Improved airflow means improved porosity and openness of the foam, which is an indication of improved dimensional stability of the foam. As gelling catalysts, these amide catalysts in conjunction with blowing co-catalysts also improve, i.e., reduce, the force-to-crush of the foam. Reduced force-to-crush means the foam is more easily compressed which is an important advantage for minimizing foam shrinkage during processing. As blowing catalysts, these amide catalysts in conjunction with gelling co-catalysts improve the load bearing properties of the foam. That such high molecular weight compounds have good catalytic activity in the production of a polyurethane is surprising, since the prior art suggests that they will react at the time of mixing and be incorporated into the polymer matrix early in the polyurethane process thus limiting their mobility.

Another embodiment of the invention provides the reactive catalysts of the present invention as blocked with different acids to yield delay action catalysts. Such acid-blocked catalysts are expected to yield, in addition to the inherent benefits of the present composition, a delay action, which can be of advantage in flexible molded and rigid polyurethane foams.

DETAILED DESCRIPTION OF THE INVENTION

The present invention provides a method for making polyurethane foams using a reactive catalyst composition that comprises a tertiary amino alkyl amide. The amide is derived from a carboxylic acid of the type $R^6$—$CO_2H$, where $R^6$ is a $C_5$–$C_{35}$ linear or branched alkyl, alkenyl, or aryl group. The catalyst is typically used in the presence of a gelling catalyst but combinations of blowing and gelling catalysts are also possible. The catalysts may contain reactive N—H groups from an amide functionality, which enables the catalyst to react with, and be immobilized into, the polyurethane matrix. These catalysts can be used as gelling catalysts or blowing catalysts with the aid (or not) of complementary tertiary amine blowing or gelling co-catalysts, which may or may not contain reactive functional groups to produce polyurethane foam materials. The reactive catalysts produce polyurethane foams, which have no amine odor or emissions.

The reactive catalyst composition of the present invention may be represented by three parts: the tertiary amine portion, the amide portion, and the long chain alkyl portion ($R^6$). The tertiary amine portion provides catalysis for producing polyurethane foams. The amide portion provides functionality, which enables the catalyst to react into the polyurethane matrix such that the resulting polyurethane foams have no amine odor or emissions. The long chain alkyl portion enables the catalyst to improve its performance by providing foams with better dimensional stability, i.e., air-flow through the foam improves with the length of the long chain alkyl portion.

Example 7 shows that conventional dialkyl amino amides, where the amide portion is derived from a simple carboxylic acid, such as formic acid or acetic acid, do not perform as well as their long chain alkyl chain or fatty acid counterparts. Amino amide catalysts, such as N-(3-dimethylaminopropyl)-formamide or N-(3-dimethylaminopropyl)-acetamide, do not perform by themselves according to the current industry standards (DABCO® BLV catalyst). The performance limitations of these compounds are very well recognized in the art and similar limitations are expected for related structures. Compounds such as N-(3-dimethylaminopropyl)-2-ethylhexamide or N-(3-dimethyl-aminopropyl)-lauramide would be expected to perform like N-(3-dimethylaminopropyl)-formamide and N-(3-dimethylaminopropyl)-acetamide with the additional limitation of having higher molecular weights that typically results in high usage levels.

Example 10 illustrates how air-flow can be systematically changed according to the catalyst composition selected. Example 10 shows that air-flow through the foam progressively improves with the length of the alkyl chain portion associated with the amide functionality. Thus, increasing the size of the alkyl chain or fatty group associated with the amide moiety can systematically increase air-flow. Example 10 shows that systematic air-flow improvements can be accomplished by appropriate choice of the reactive catalyst composition or by its usage level (see also Example 11).

Surprisingly, the examples presented in this disclosure clearly show that long chain alkyl chain and fatty acid derivatives perform better than their lower molecular weight counterparts because the rate of rise profiles can, in most cases, be superimposed to the current fugitive industry standard (DABCO® BLV catalyst). The Me₂N-moiety in N-(3-dimethylaminopropyl)-formamide and in N-(3-dimethylaminopropyl)-acetamide seems to be catalytically less active than the Me₂N-moiety in, for example, N-(3-dimethylaminopropyl)-lauramide. Moreover, catalyst usage remained modest even though the molecular weights of the fatty acid catalysts are much larger than the molecular weight of the standards. Although the higher activity of the present catalyst compositions can explain their modest usage level, the reason for this enhanced activity is not obvious and not clearly understood. In addition, the benefit is not limited to a kinetic rate matching but also to a systematic improvement in the quality of the foams as evidence by the air-flow values.

The catalyst compositions according to the present invention catalyze the reaction between an isocyanate functionality and an active hydrogen-containing compound, i.e., an alcohol, a polyol, an amine, or water. The catalyst compositions also catalyze the urethane (gelling) reaction of polyol hydroxyl groups with isocyanate to make polyurethanes and the blowing reaction of water with isocyanate to release carbon dioxide for making foamed polyurethanes.

The flexible foam products are prepared using any suitable organic polyisocyanates known in the art including, for example, hexamethylene discarnate, phenylene discarnate, toluene discamate (TDI) and 4,4'-diphenylmethane discarnate (MDI). Especially suitable are the 2,4- and 2,6-TDI's individually or together as their commercially available mixtures. Other suitable isocyanates are mixtures of diisocyanates known commercially as "crude MDI", marketed as PAPI by Dow Chemicals, which contains about 60% of 4,4'-diphenylmethane discamate along with other isomeric and analogous higher polyisocyanates. Also suitable are "prepolymers" of these polyisocyanates comprising a partially prereacted mixture of a polyisocyanate and a polyether or polyester polyol.

Illustrative examples of suitable polyols as a component of the polyurethane composition are the polyalkylene ether and polyester polyols. The polyalkylene ether polyols include the poly(alkylene oxide) polymers such as poly (ethylene oxide) and poly(propylene oxide) polymers and copolymers with terminal hydroxyl groups derived from polyhydric compounds, including diols and triols; for example, ethylene glycol, propylene glycol, 1,3-butane diol, 1,4butane diol, 1,6-hexane diol, neopentyl glycol, diethylene glycol, dipropylene glycol, pentaerythritol, glycerol, diglycerol, trimethylol propane and similar low molecular weight polyols.

In the practice of this invention, a single high molecular weight polyether polyol may be used. Also, a mixture of high molecular weight polyether polyols such as mixtures of di- and tri-functional materials and/or different molecular weight or different chemical composition materials may be used.

Useful polyester polyols include those produced by reacting a dicarboxylic acid with an excess of a diol, for example, adipic acid with ethylene glycol or butanediol, or reaction of a lactone with an excess of a diol such as caprolactone with propylene glycol.

In addition to the polyester and polyethers polyols, the master batches, or premix compositions, frequently contain a polymer polyol. Polymer polyols are used in polyurethane foams to increase the foam's resistance to deformation, i.e., to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol, which is formed by the in-situ polymerization of TDI and alkanolamine in the polyol. Depending upon the load-bearing requirements, polymer polyols may comprise 20–80% of the polyol portion of the master batch.

Other typical agents found in the polyurethane foam formulations include chain extenders such as ethylene glycol and butane diol; cross-linkers such as diethanolamine, diisopropanolamine triethanolamine and tripropanolamine; blowing agents such as water, CFCs, HCFCs, HFCs, pentane, and the like; and cell stabilizers such as silicone surfactants.

A general polyurethane flexible foam formulation containing a gelling and a blowing catalyst according to the invention would comprise the following components in parts by weight (pbw):

| | |
|---|---|
| Polyol | 20–100 |
| Polymer Polyol | 80–0 |
| Silicone Surfactant | 1–2.5 |
| Blowing agent | 2–4.5 |
| Crosslinker | 0.5–2 |
| Catalyst | 0.25–2 |
| Isocyanate Index | 70–115 |

The catalyst composition comprises a tertiary amino alkyl amide composition represented by the formula I:

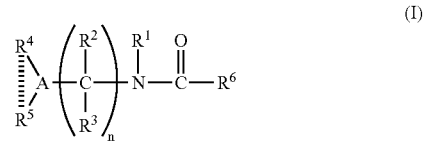

(I)

wherein A represents CH or N;
R¹ represents hydrogen or

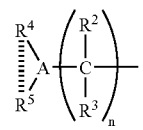

n is an integer from 1 to 3;
R² and R³ each represent hydrogen or a C₁–C₆ linear or branched alkyl group;
R⁴ and R⁵ each represent a C₁–C₆ linear or branched alkyl group when A represents N, or together R⁴ and R⁵ represent a C₂–C₅ alkylene group when A represents N; or together R⁴ and R⁵ may be a C₂–C₅ alkylene group containing NR⁷ when A represents CH or N, where R⁷ is selected from the group consisting of hydrogen, a C₁–C₄ linear or branched alkyl group, and

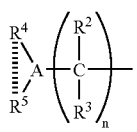

and; $R^6$ represents a $C_5$–$C_{35}$ linear or branched alkyl, alkenyl, or aryl group.

Preferably, $R^1$, $R^2$, and $R^3$ each represent hydrogen and $R^4$ and $R^5$ each represent a methyl group when A represents N. $R^4$ and $R^5$ together may represent —$CH_2CH_2N(CH_3)CH_2$— when A represents CH. Preferably, n represents 2 or 3.

Illustrative examples of dialkylamino amides derived from higher alkyl and fatty acids are: the N-(3-dimethylaminopropyl)-amides, the N-(2-dimethylaminoethyl)-amides, the N-methyl-3-aminoethyl pyrrolidine amides, the 4, 10-diaza-4, 10, 10-trimethyl-7-oxa-undecaamine amides, and any dimethylamino- or dialkylamino-alkyl, or alkylsubstituted amides derived from 2-ethylhexanoic, coconut oil fatty, tall oil fatty, caproic, heptylic, caprylic, pelargonic, capric, hendecanoic, lauric, tridecanoic, myristic, pentadecanoic, palmitic, margaric, stearic, oleic, linoleic, linolenic, ricinoleic, nonadecanoic, arachidic, heneicosanoic, behenic, tricosanoic, lignoceric, pentacosanoic, cerotic, heptacosanoic, montanic, nonacosanoic, melissic, hentriacontanoic, dotriacontanoic, tritriacontanoic, tetracontanoic, hexatriacontanoic or their aliphatic or aromatic substituted derivatives such as 9- and 10-phenylstearic and related structures.

The preferred amides are N-(3-dimethylaminopropyl)-amides. The preferred acids are selected from the group consisting of 2-ethylhexanoic, coconut oil fatty, and tall oil fatty acids.

The amides are prepared by reacting a carboxylic acid and the corresponding tertiary alkyl amine in the appropriate molar ratios at elevated temperatures of from 80° C. to 300° C., preferably 100° C. to 200° C., with water being driven off. The amides can be further purified by distillation or chromatography as known in the art.

The amides can be used in conjunction with a gelling catalyst, such as a tertiary amine or a suitable transition metal catalyst, and/or a blowing catalyst depending upon the processing advantages desired.

Examples of suitable tertiary amine gelling catalysts include, but are not restricted to, diazabicyclooctane (triethylenediamine), supplied commercially as DABCO 33LV® catalyst by Air Products and Chemicals Inc., quinuclidine and substituted quinuclidines, substituted pyrrolidines and pyrrolizidines. Examples of suitable tertiary amine blowing catalysts include, but are not restricted to, bis-dimethylaminoethyl ether, commercially supplied as DABCO® BL11 catalyst by Air Products and Chemicals, Inc., pentamethyldiethylenetriamine and related compositions, higher permethylated polyamines, 2-[N-(dimethylaminoethoxyethyl)-N-methylamino]ethanol and related structures, alkoxylated polyamines, imidazole-boron compositions and amino propyl-bis(amino-ethyl)ether compositions.

In another embodiment of the invention, the reactive catalysts of the present invention can be blocked with different acids to yield delay action catalysts. Such acid-blocked catalysts are expected to yield, in addition to the inherent benefits of the present composition, a delay action, which can be of advantage in flexible molded and rigid polyurethane foams. The acid-blocked catalysts can simply be obtained by reacting the catalyst composition with carboxylic acids such as formic acid, acetic acids, 2-ethylhexanoic acid, gluconic acid, N-(2-hydroxyethyl)-iminodiacetic acid, and the like as is well known in the art. The salts obtained are not catalytically active and consequently they do not activate the polyurethane/blowing reactions until the temperature is sufficiently high that dissociation of the salts start to occur. Acid-blocked catalysts of the present invention can find their main applications in molded flexible and rigid foams where delaying the onset of the reaction is desired. This delay causes the viscosity to increase slowly allowing the proper filling of a mold while maintaining the overall molding time as short as possible to maintain maximum productivity.

A catalytically effective amount of the catalyst composition comprising the amide and a tertiary amine gelling or blowing catalyst may be used in the polyurethane formulation. More specifically suitable amounts of the catalyst composition may range from about 0.01 to 10 parts by wt per 100 parts polyol (pphp) in the polyurethane formulation, preferably 0.05 to 2 pphp.

The catalyst composition may be used in combination with, or also comprise, other tertiary amines, organotin or carboxylate urethane catalysts well known in the urethane art.

Although the present invention has been described as useful for preparing flexible polyurethane foams, the invention may also be employed to prepare semi-flexible and rigid polyurethane foams. Rigid polyurethane foams can be distinguished from flexible polyurethane foams by the presence of higher isocyanurate levels in the rigid foam. Flexible foams typically use polymer polyol as part of the overall polyol content in the foam composition, along with conventional triols of 4000–5000 weight average molecular weight (Mw) and hydroxyl number (OH#) of 28–35. In contrast, rigid polyurethane foam compositions use 500–1000 Mw polyol with 3–8 hydroxyl functionalities and OH# of 160–700. Rigid foams can also be distinguished from the flexible foams by the isocyanate (NCO) index of the foam composition. Rigid foam compositions typically use a 100–300 NCO index whereas flexible foam compositions typically require a 70–115 NCO index.

A general polyurethane rigid insulating foam formulation containing the catalyst composition according to the invention would comprise the following components in parts by weight (pbw):

| | |
|---|---|
| Polyol | 100 |
| Silicone Surfactant | 1–3 |
| Blowing Agent | 0–50 |
| Water | 0–8 |
| Catalyst | 0.5–15 |
| Isocyanate Index | 80–300 |

For making lamination (insulation board) and appliance foams the NCO index is typically 100–300; for making open cell foam the NCO index is typically 100–120 and the foam is usually all water blown.

Semiflexible molded foams have been utilized for many applications in the automotive area. The major applications are instrument panels and interior trims. A typical semiflexible foam formulation containing the catalyst composition according to the invention comprise the following components in parts by weight (pbw):

| | |
|---|---|
| SPECFLEX NC 630 Polyol | 80.0 |
| SPECFLEX NC 710 Copolymer | 20.0 |
| Cross-linker | 1.5 |
| Water | 2.2 |
| Catalyst | 0.5–10 |
| Black Colorant | 0.3 |
| Adhesion Promoter | 2.0 |
| Cell Opener | 1.0 |
| Polymeric MDI, Index | 105 |

The two main components are the base polyol and copolymer polyol (CPP). The base polyol is utilized at levels between 70–100%. The molecular weight of base polyols range from 4500 to 6000 for triols and 2000 to 4000 for diols. Ethylene-oxide-capped polyether polyols have replaced most polyester polyols as the base polyol. The primary hydroxyl content is usually grater than 75% and the capping range is typically 10–20%. The other major component is CPP, which are used at levels of 0 to 20%. The base polyol and CPP are blended with low molecular weight cross linkers to build hardness and promote faster demolding. The level of cross linker varies depending on the hardness requirement of the finished part. Water levels are chosen to give free rise densities from 3 to 6 pounds. Cell openers are also utilized in semiflexible foams to reduce the internal foam pressure during the cure cycle and thus reduce pressure-relief voids and "parting lines". Adhesion promoters can be added, depending upon the quality of the vinyl skin, to improve the adhesion between the polyurethane foam and the vinyl skin. The use of the catalyst composition of the present invention can reduce the discoloration of the vinyl skin typically observed with conventional amine catalysts because the N—H group of the amide functionality can react with the isocyanate to form a covalent bond with the polyurethane polymer.

The present invention is further illustrated by the following examples, which are presented for purposes of demonstrating, but not limiting, the preparation of the compounds and compositions of this invention.

EXAMPLE 1

Synthesis of N-(3-dimethylaminopropyl)-acetamide (DMAPA-acetamide)

Into a 500 ml three necked round bottom flask equipped with a Teflon coated magnetic stir bar and a pressure equalizing dropping funnel was placed 83.89 g of 3-dimethylaminopropylamine (DMAPA). Excess acetic acid (210 g) was slowly added to the reaction mixture while the temperature was monitored with a thermocouple. At the end of the addition, the liquid was heated to reflux for five hours and the progress of the reaction was monitored by GC. Excess acetic acid was removed by distillation to give 118 g of N,N-dimethylaminopropylamino-acetamide as a pale yellow liquid.

EXAMPLE 2

Synthesis of N-(3-dimethylaminopropyl)-formamide (DMAPA-formamide)

Into a 500 ml three necked round bottom flask equipped with a Teflon coated magnetic stir bar and a pressure equalizing dropping funnel was placed 80 g of DMAPA. Excess formic acid (160 g) was slowly added to the reaction mixture while the temperature was monitored with a thermocouple. At the end of the addition, the liquid was heated to reflux for two hours and the progress of the reaction was monitored by GC. The product was distilled under reduced pressure to give 93.4 g of N,N-dimethyl-aminopropylamino-formamide as a clear and colorless liquid.

EXAMPLE 3

Synthesis of N-(3-dimethylaminopropyl)-2-ethyl-hexamide (DMAPA-2-ethyl-hexamide)

Into a 500 ml three necked round bottom flask equipped with a Teflon coated magnetic stir bar and a pressure equalizing dropping funnel was placed 100 g of DMAPA. Addition of 2-ethyl-hexanoic acid (120 g) was monitored with a thermocouple. At the end of the addition, the liquid was heated to reflux and the progress of the reaction was monitored by GC. At the end of the reaction, excess DMAPA was removed under reduced pressure to give 190 g of 3-(N,N-dimethylamino)-1-(2-ethylhexanoyl)-propionamide as a clear yellow liquid.

EXAMPLE 4

Synthesis of N-(3-dimethylaminopropyl)-lauramide (DMAPA-lauramide)

Into a 500 ml three necked round bottom flask equipped with a Teflon coated magnetic stir bar and a pressure equalizing dropping funnel was placed 88 g of DMAPA. Lauric acid (100 g) was slowly added to the reaction mixture while the temperature was monitored with a thermocouple. At the end of the addition, the liquid was heated to reflux and as the reaction proceeded, water was removed. Once the reaction was completed, excess DMAPA was removed under reduced pressure to give 141 g of 3-(N, N-dimethylamino)-1-(lauroyl)-propionamide as a yellow solid. A 52% solution in DPG (dipropylene glycol) was used as catalyst.

EXAMPLE 5

Synthesis of N-(3-dimethylaminopropyl)-cocoamide (DMAPA-cocoamide)

Into a 500 ml three necked round bottom flask equipped with a Teflon coated magnetic stir bar and a pressure equalizing dropping funnel was placed 88 g of DMAPA.

Coconut oil fatty acid (100 g) was slowly added to the reaction mixture while the temperature was monitored with a thermocouple and at the end of the addition, the liquid was heated to reflux. Water was periodically removed as the reaction proceeded. Once finished, the excess DMAPA was removed under reduced pressure to give 147 g of amide product as a pale yellow liquid that slowly solidified when sitting on the bench.

EXAMPLE 6

Synthesis of N-(3-dimethylaminopropyl)-tall oil amide (DMAPA-TOFA)

Into a 500 ml three necked round bottom flask equipped with a Teflon coated magnetic stir bar and a pressure equalizing dropping funnel was placed 26 g of DMAPA. Tall oil fatty acid (61 g) was slowly added to the reaction mixture while the temperature was monitored with a thermocouple and at the end of the addition, the liquid was heated to reflux. Water was periodically removed under reduced pressure as the reaction proceeded. Once finished, the excess DMAPA was removed under reduced pressure to give 74 g of amide product as an amber liquid.

EXAMPLE 7

Rate Of Rise Of Foams: DMAPA-Formamide and DMAPA-Acetamide vs. DABCO®BLV Catalyst—the Industry Standard In this example, polyurethane foams were prepared in a conventional manner. The polyurethane formulation in parts by weight was:

| COMPONENT | PARTS |
|---|---|
| VORANOL ® 3512A[1] | 100.00 |
| WATER | 4.60 |
| DABCO ® DC 5982[2] | 0.90 |
| CATALYST[3] | 0.12 (DABCO ® BLV) |
| DABCO ® T-10[4] | 0.52 |
| TDI | 56.20 |
| Index | 108 |

[1]polyol;
[2]commercial silicon surfactant supplied by Air Products and Chemicals, Inc.;
[3]DABCO ® BLV catalyst is a commercially available catalyst supplied by Air Products and Chemicals, Inc. composed of 75 wt. % of DABCO 33-LV ® catalyst (a 33% solution of triethylenediamine in dipropylene glycol) and 25 wt. % of DABCO ® BL-11 catalyst (70% solution of bis-dimethylaminoethylether in dipropylene glycol);
[4]commercially available tin catalyst supplied by Air Products and Chemicals, Inc.

For each foam made, the catalyst was added to 159 g of the above premix in a 32 oz (951 ml) paper cup and the formulation was mixed for 10 sec at 6,000 RPM using an overhead stirrer fitted with a 2 in (5.1 cm) diameter stirring paddle. Sufficient TDI 80 was added to make a 108 index foam [index=(mole NCO/mole of active hydrogen)×100] and the formulation was mixed well for 6 sec at 6,000 RPM using the same stirrer. The 32 oz (951 ml) cup was dropped through a hole in the bottom of a 128 oz (3804 ml) paper cup on a stand. The hole was sized to catch the lip of the 32 oz cup. The total volume of the foam container was 160 oz (4755 ml). Foams approximated this volume at the end of the foam forming process. Maximum foam height was recorded.

The following data provides a comparison between DABCO®BLV catalyst (industry standard, hereinafter "BLV") and 3-(N,N-dimethylamino)-1-formyl-propionamide:

| PARAMETER | BLV | Catalyst = DMAPA-Formamide | | |
|---|---|---|---|---|
| | | FORMAMIDE | FORMAMIDE | FORMAMIDE |
| PPHP | 0.12 | 0.093 | 0.11 | 0.126 |
| MOLES* × 10³ | 0.80 | 0.71 | 1.6 | 0.97 |
| MIXING TIME [s] | 12 | 12 | 12 | 12 |
| TEST TIME [s] | 300 | 300 | 300 | 300 |
| RISE HEIGHT [mm] | 394 | 383.4 | 388.6 | 378.8 |
| RISE TIME [s] | 103.6 | 133.8 | 122.8 | 134.8 |
| MAX HEIGHT [mm] | 399.5 | 388.6 | 393.8 | 383.9 |
| FINAL HEIGHT [mm] | 398.9 | 388.2 | 393.2 | 383.2 |
| SHRINKAGE [%] | 2.4 | 2.6 | 2.3 | 2.4 |

*moles of catalytically active nitrogen

This data shows that DMAPA-formamide is not as effective as BLV. The rise time is too long (103.6 sec for BLV vs. 122.8 sec for DMAPA-formamide at 0.11 pphp) and it cannot be corrected by the addition of more catalyst. In fact, rise time increases with the addition of more catalyst. Also, the maximum height is smaller for the DMAPA-formamide examples.

The following data provides a comparison between BLV (industry standard) and 3-(N,N-dimethylamino)-1-acetyl-propionamide:

| | Catalyst = DMAPA-Acetamide | | | |
|---|---|---|---|---|
| PARAMETER | BLV | ACETAMIDE | ACETAMIDE | ACETAMIDE |
| PPHP | 0.12 | 0.14 | 0.17 | 0.22 |
| MOLES* × $10^3$ | 0.80 | 0.97 | 1.2 | 1.52 |
| MIXING TIME [s] | 12 | 12 | 12 | 12 |
| TEST TIME [s] | 300 | 300 | 300 | 300 |
| RISE HEIGHT [mm] | 283.6 | 284.4 | 277.5 | 274.5 |
| RISE TIME [s] | 103.3 | 116.5 | 109.9 | 102.3 |
| MAX HEIGHT [mm] | 289.2 | 289.9 | 282.7 | 279.9 |
| FINAL HEIGHT [mm] | 287.8 | 288.3 | 281.0 | 278.1 |
| SHRINKAGE [%] | 0.5 | 0.6 | 0.7 | 0.7 |

*moles of catalytically active nitrogen

The data shows that DMAPA-acetamide is not as effective as BLV. Although both catalysts have similar rise times (103.3 sec for BLV vs. 102.3 sec for a DMAPA-acetamide usage of 0.22 pphp), the final foam height is significantly smaller for the acetamide case (289.2 mm for BLV vs. 279.9 for DMAPA-acetamide).

EXAMPLE 8

Rate Of Rise Of Foams:
DMAPA-2-Ethyl-Hexamide and
DMAPA-Lauramide vs. BLV Industry Standard The following data provides a comparison between BLV (industry standard) and the DMAPA amides of lauric acid and 2-ethyl-hexanoic acid.

| | DMAPA-Lauramide (52% DPG Solution) And DMAPA-2-Ethylhexamide vs. BLV | | | |
|---|---|---|---|---|
| PARAMETER | DABCO ® BLV | 2-ETHYL HEXAMIDE | LAURAMIDE | BLV |
| PPHP | 0.12 | 0.14 | 0.38 | 0.12 |
| MOLES* × $10^3$ | 0.80 | 0.6 | 0.7 | 5.6 |
| MIXING TIME [s] | 12 | 12 | 12 | 12 |
| TEST TIME [s] | 300 | 300 | 300 | 300 |
| RISE HEIGHT [mm] | 407.1 | 400.2 | 399.3 | 398.1 |
| RISE TIME [s] | 108.1 | 107.2 | 113.7 | 113.2 |
| MAX HEIGHT [mm] | 412.8 | 408.4 | 404.9 | 403.6 |
| FINAL HEIGHT [mm] | 411.9 | 407.8 | 404.2 | 403.2 |
| SHRINKAGE [%] | 2.3 | 1.5 | 2.1 | 2.0 |

*moles of catalytically active nitrogen

The above table shows two BLV controls and the results obtained for DMAPA-lauramide and DMAPA-2-ethylhexamide. Typically, under these conditions dialkylamine catalysts are expected to be less active than the standards but surprisingly both amide derivatives showed rise time and maximum height.

EXAMPLE 9

Rate Of Rise Of Foams: DMAPA-Amide of Tall Oil Fatty Acid vs. BLV Industry Standard The following data provides a comparison between BLV (industry standard) and 3-(N,N-dimethylamino)-1-tall oil-propionamide:

| | DMAPA Amide Of Tall Oil Fatty Acid vs. BLV | |
|---|---|---|
| PARAMETER | BLV | TALL OIL FATTY ACIDS |
| PPHP | 0.12 | 0.24 |
| MOLES* × $10^3$ | 0.80 | 0.66 |
| MIXING TIME [s] | 12 | 12 |
| TEST TIME [s] | 300 | 300 |
| RISE HEIGHT [mm] | 298.4 | 303.0 |
| RISE TIME [s] | 104.9 | 105.7 |

-continued

| DMAPA Amide Of Tall Oil Fatty Acid vs. BLV | | |
|---|---|---|
| PARAMETER | BLV | TALL OIL FATTY ACIDS |
| MAX HEIGHT [mm] | 304.5 | 309.2 |
| FINAL HEIGHT [mm] | 304.5 | 309.2 |
| SHRINKAGE [%] | 2.3 | 2.1 |

*moles of catalytically active nitrogen

The above table shows the results obtained for BLV control and DMAPA-TOFA amide. This amide shows a rise time comparable to BLV but with improved foam height. The excellent performance of this amide composition is manifested despite the fact that the number of catalytically active nitrogens in the amide case is almost the same as in the BLV case.

EXAMPLE 10

Physical Properties Of Polyurethane Foams

In this example, a variety of amides of formula $Me_2N—(CH_2)_3—NHCO—R$ were evaluated to illustrate the effect of the size of the alkyl chain R on the air-flow of the foam. Larger foams (scale factor=3.2) were prepared using the following formulation:

| COMPONENT | PARTS |
|---|---|
| VORANOL ® 3512A | 100.00 |
| WATER | 4.60 |
| DABCO ® DC 5982 | 0.90 |
| AMINE CATALYST | VARIABLE |
| DABCO ® T-10[4] | 0.42 |
| TDI | 56.20 |
| Index | 108 |

For each foam, the catalyst was added to 339.2 g of the above premix in a 32 oz (951 ml) paper cup and the formulation was mixed for 10 sec at 6,000 RPM using an overhead stirrer fitted with a 2 in (5.1 cm) diameter stirring paddle. Sufficient TDI 80 was added to make a 108 index foam [index=(mole NCO/mole of active hydrogen)×100] and the formulation was mixed well for 6 sec at 6,000 RPM using the same stirrer. The content was poured into a 3.5 gallon container. Foams approximated this volume at the end of the foam forming process. Maximum foam height was recorded and the physical properties evaluated. The catalysts evaluated were all amides derived from DMAPA (3-N,N-dimethylamino-propylamine):

DMAPA-2-EHA: DMAPA amide from 2-ethyl-hexanoic acid

DMAPA-O: DMAPA amide from octanoic acid

DMAPA-L: 52% DPG solution of DMAPA amide from lauric acid

DMAPA-T: DMAPA amide from tall oil fatty acids (TOFA)

DMAPA-C: DMAPA amide from coconut oil fatty acid

| | | | Physical Properties | | | |
|---|---|---|---|---|---|---|
| CATALYST | PPHP | MOLES × 10³ | TEAR (lbf) | TENSILE (psi) | DENSITY (lb/cu.ft) | % Break Elongation |
| BLV | 0.12 | 0.80 | 1.45 + 0.27 | 11.9 ± 0.27 | 1.46 ± 0.098 | 112.5 + 9.76 |
| DMAPA-2-EHA | 0.23 | 1.00 | 1.25 ± 0.11 | 10.7 ± 0.37 | 1.46 ± 0.062 | 91.3 + 5.94 |
| DMAPA-O | 0.20 | 0.87 | 1.38 ± 0.18 | 10.8 ± 0.63 | 1.44 ± 0.090 | 107.7 + 11.5 |
| DMAPA-L | 0.38 | 0.69 | 1.74 ± 0.25 | 11.7 ± 0.32 | 1.48 ± 0.086 | 121.2 + 13.3 |
| DMAPA-C | 0.20 | 0.70 | 1.24 ± 0.16 | 11.2 ± 0.54 | 1.45 ± 0.080 | 107.6 + 10.7 |
| DMAPA-T | 0.40 | 1.00 | 1.36 ± 0.12 | 11.1 ± 0.59 | 1.45 ± 0.074 | 114.4 + 12.8 |

| CATALYST | PPHP | MOLES × 10³ | AIR-FLOW (SCFM) | Alkyl Chain |
|---|---|---|---|---|
| BLV | 0.12 | 0.80 | 3.72 ± 0.91 | |
| DMAPA-2-EHA | 0.23 | 1.00 | 3.07 ± 0.84 | Branched-C8 |
| DMAPA-O | 0.20 | 0.87 | 3.47 ± 0.84 | Linear-C8 |
| DMAPA-L | 0.38 | 0.69 | 3.76 ± 1.0 | Linear-C12 |
| DMAPA-C | 0.20 | 0.70 | 3.12 ± 1.2 | Mainly-C12 |
| DMAPA-T | 0.40 | 1.00 | 4.36 ± 1.0 | Mainly-C18 |

The table above shows that air-flow in a polyurethane foam can be systematically controlled by the choice of tertiary amino alkyl amide catalyst. As the length of the alkyl chain in the amide increases, the air-flow of the foam improves. Improved air-flow means improved porosity and openness of the foam, which is an indication of improved dimensional stability of the foam.

EXAMPLE 11

Physical Properties Of Polyurethane Foams

In this example, foams were made using different loading of DMAPA-TOFA catalyst and the physical properties were evaluated. Foams were made according to the formulation of Example 10:

Physical Properties DMAPA-TOFA Amide

| CATALYST | PPHP | MOLES × 10³ | TEAR (lbf) | TENSILE (psi) | DENSITY (lb/cu.ft) | AIR-FLOW (SCFM) |
|---|---|---|---|---|---|---|
| BLV | 0.12 | 0.8 | 1.22 | 9.9 | 1.64 | 2.63 |
| DMAPA-TOFA | 0.24 | 0.6 | 1.61 | 10.5 | 1.52 | 2.13 |
| DMAPA-TOFA | 0.36 | 1.0 | 1.35 | 10.5 | 1.53 | 3.30 |
| DMAPA-TOFA | 0.71 | 1.9 | 1.45 | 8.96 | 1.55 | 3.88 |

The results show that air-flow can also be systematically changed by varying amino-amide catalyst loadings.

While a number of embodiments of this invention have been represented, it is apparent that the basic construction can be altered to provide other embodiments, which utilize the invention without departing from the spirit and scope of the invention. All such modifications and variations are intended to be included within the scope of the invention as defined in the appended claims rather than the specific embodiments, which have been presented by way of example.

The invention claimed is:

1. A method for preparing a polyurethane foam which comprises reacting an organic polyisocyanate and a polyol in the presence of water as a blowing agent, a cell stabilizer, and a tertiary amino alkyl amide catalyst composition represented by the formula I:

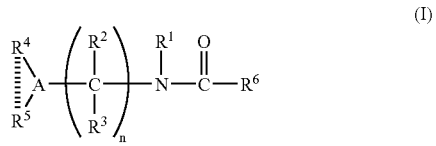

(I)

wherein A represents CH or N;
$R^1$ represents hydrogen or

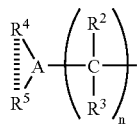

n is an integer from 1 to 3;
$R^2$ and $R^3$ each represent hydrogen or a $C_1$–$C_6$ linear or branched alkyl group;
$R^4$ and $R^5$ each represent a $C_1$–$C_6$ linear or branched alkyl group when A represents N, or together $R^4$ and $R^5$ represent a $C_2$–$C_5$ alkylene group when A represents N; or together $R^4$ and $R^5$ may be a $C_2$–$C_5$ alkylene group containing $NR^7$ when A represents CH or N, where $R^7$ is selected from the group consisting of hydrogen, a $C_1$–$C_4$ linear or branched alkyl group, and

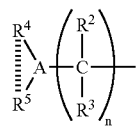

and; $R^6$ represents a $C_5$–$C_{35}$ linear or branched alkyl, alkenyl, or aryl group, and where the tertiary amino alkyl amide catalyst is acid-blocked with an acid which is formic acid, acetic acid, 2-ethylhexanoic acid, gluconic acid, or N-(2-hydroxyethyl)iminodiacetic acid.

2. The method of claim 1, wherein $R^1$, $R^2$, and $R^3$ each represent hydrogen.

3. The method of claim 1, wherein $R^4$ and $R^5$ each represent a methyl group when A represents N.

4. The method of claim 1, wherein $R^4$ and $R^5$ together represent —$CH_2CH_2N(CH_3)CH_2$— when A represents CH.

5. The method of claim 1, wherein n represents 2 or 3.

6. The method of claim 1, wherein the tertiary amino alkyl amide catalyst composition is an N-(3-dimethylaminopropyl)-amide derived from an acid selected from the group consisting of 2-ethylhexanoic, coconut oil fatty, tall oil fatty, caproic, heptylic, caprylic, pelargonic, capric, hendecanoic, lauric, tridecanoic, myristic, pentadecanoic, palmitic, margaric, stearic, oleic, linoleic, linolenic, ricinoleic, nonadecanoic, arachidic, heneicosanoic, behenic, tricosanoic, lignoceric, pentacosanoic, cerotic, heptacosanoic, montanic, nonacosanoic, melissic, hentriacontanoic, dotriacontanoic, tritriacontanoic, tetracontanoic, hexatriacontanoic, 9-phenylstearic, and 10-phenylstearic acid.

7. The method of claim 6, wherein the acid is selected from the group consisting of 2-ethylhexanoic, coconut oil fatty, and tall oil fatty acids.

8. The method of claim 1, wherein the tertiary amino alkyl amide catalyst composition is an N-(2-dimethylaminoethyl)-amide derived from an acid selected from the group consisting of 2-ethylhexanoic, coconut oil fatty, tall oil fatty, caproic, heptylic, caprylic, pelargonic, capric, hendecanoic, lauric, tridecanoic, myristic, pentadecanoic, palmitic, margaric, stearic, oleic, linoleic, linolenic, ricinoleic, nonadecanoic, arachidic, heneicosanoic, behenic, tricosanoic, lignoceric, pentacosanoic, cerotic, heptacosanoic, montanic, nonacosanoic, melissic, hentriacontanoic, dotriacontanoic, tritriacontanoic, tetracontanoic, hexatriacontanoic, 9-phenylstearic, and 10-phenyistearic acid.

9. The method of claim 8, wherein the acid is selected from the group consisting of 2-ethylhexanoic, coconut oil fatty, and tall oil fatty acids.

10. The method of claim 1, wherein the tertiary amino alkyl amide catalyst composition is an N-methyl-3-aminoethyl pyrrolidine amide derived from an acid selected from the group consisting of 2-ethylhexanoic, coconut oil fatty, tall oil fatty, caproic, heptylic, caprylic, pelargonic, capric, hendecanoic, lauric, tridecanoic, myristic, pentadecanoic, palmitic, margaric, stearic, oleic, linoleic, linolenic, ricinoleic, nonadecanoic, arachidic, heneicosanoic, behenic, tricosanoic, lignoceric, pentacosanoic, cerotic, heptacosanoic, montanic, nonacosanoic, melissic, hentriacontanoic, dotriacontanoic, tritriacontanoic, tetracontanoic, hexatriacontanoic, 9-phenylstearic, and 10-phenylstearic acid.

11. The method of claim 10, wherein the acid is selected from the group consisting of 2-ethylhexanoic, coconut oil fatty, and tall oil fatty acids.

12. The method of claim 1, wherein the tertiary amino alkyl amide catalyst composition is a 4, 10-diaza-4, 10, 10-trimethyl-7-oxa-undecaamine amide derived from an acid selected from the group consisting of 2-ethylhexanoic, coconut oil fatty, tall oil fatty, caproic, heptylic, caprylic, pelargonic, capric, hendecanoic, lauric, tridecanoic, myristic, pentadecanoic, palmitic, margaric, stearic, oleic, linoleic, linolenic, ricinoleic, nonadecanoic, arachidic, heneicosanoic, behenic, tricosanoic, lignoceric, pentacosanoic, cerotic, heptacosanoic, montanic, nonacosanoic, melissic, hentriacontanoic, dotriacontanoic, tritriacontanoic, tetracontanoic, hexatriacontanoic, 9-phenylstearic, and 10-phenylstearic acid.

13. The method of claim 12, wherein the acid is selected from the group consisting of 2-ethylhexanoic, coconut oil fatty, and tall oil fatty acids.

14. The method of claim 1, wherein the tertiary amino alkyl amide catalyst composition is N-(3-dimethylaminopropyl)-2-ethyl-hexamide.

15. The method of claim 1, wherein the tertiary amino alkyl amide catalyst composition is N-(3-dimethylaminopropyl)-cocoamide.

16. The method of claim 1, wherein the tertiary amino alkyl amide catalyst composition is N-(3-dimethylaminopropyl)-tall oil amide.

17. The method of claim 1, which comprises reacting the following components in parts by weight (pbw):

| | |
|---|---|
| Polyol | 20–100 |
| Polymer Polyol | 80–0 |
| Silicone Surfactant | 1–2.5 |
| Blowing agent | 2–4.5 |
| Crosslinker | 0.5–2 |
| Catalyst | 0.25–2 |
| Isocyanate Index | 70–115. |

18. In a method for preparing a polyurethane foam which comprises reacting an organic polyisocyanate and a polyol in the presence of water as a blowing agent, a cell stabilizer, and a catalyst composition, the improvement of controlling and improving the porosity and openness of the foam which comprises using a tertiary amino alkyl amide catalyst composition represented by the formula I:

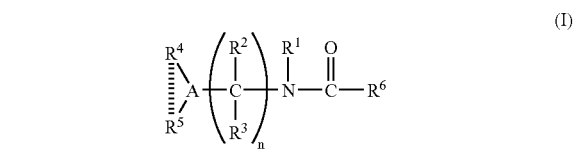

wherein A represents OH or N;

$R^1$ represents hydrogen or

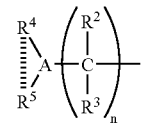

n is an integer from 1 to 3;

$R^2$ and $R^3$ each represent hydrogen or a $C_1$–$C_6$ linear or branched alkyl group;

$R^4$ and $R^5$ each represent a $C_1$–$C_5$ linear or branched alkyl group when A represents N, or together $R^4$ and $R^5$ represent a $C_2$–$C_5$ alkylene group when A represents N; or together $R^4$ and $R^5$ may be a $C_2$–$C_5$ alkylene group containing $NR^7$ when A represents CH or N, where $R^7$ is selected from the group consisting of hydrogen, a $C_1$–$C_4$ linear or branched alkyl group, and

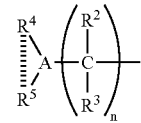

and; $R^6$ represents a $C_5$–$C_{35}$ linear or branched alkyl, alkenyl, or aryl group, and where the tertiary amino alkyl amide catalyst is acid-blocked with a carboxylic acid which is formic acid, acetic acid, 2-ethylhexanoic acid, pluconic acid, or N-(2-hydroxyethyl)iminodiacetic acid.

* * * * *

UNITED STATES PATENT AND TRADEMARK OFFICE
CERTIFICATE OF CORRECTION

PATENT NO. : 7,192,990 B2 Page 1 of 1
APPLICATION NO. : 10/724888
DATED : March 20, 2007
INVENTOR(S) : Juan J. Burdeniuc It is certified that error appears in the above-identified patent and that said Letters Patent is hereby corrected as shown below:

Column 18, Line 52

In claim 8 delete "phenyistearic" and insert -- phenylstearic --

Column 20, Line 10

In claim 18 delete "OH" and insert -- CH --

Column 20, Line 24

In claim 18 delete "$C_5$" and insert -- $C_6$ --

Column 20, Line 44

In claim 18 delete "pluconic" and insert -- gluconic --

Signed and Sealed this

First Day of May, 2007

JON W. DUDAS
*Director of the United States Patent and Trademark Office*